Sept. 21, 1948.    C. A. ROBERTSON    2,449,717
HYDRAULIC CLUTCH

Filed March 10, 1945    3 Sheets-Sheet 1

INVENTOR.
CHARLES A. ROBERTSON
BY
Boyken, Mohler & Beckley
ATTORNEYS.

Sept. 21, 1948.   C. A. ROBERTSON   2,449,717
HYDRAULIC CLUTCH
Filed March 10, 1945   3 Sheets-Sheet 2
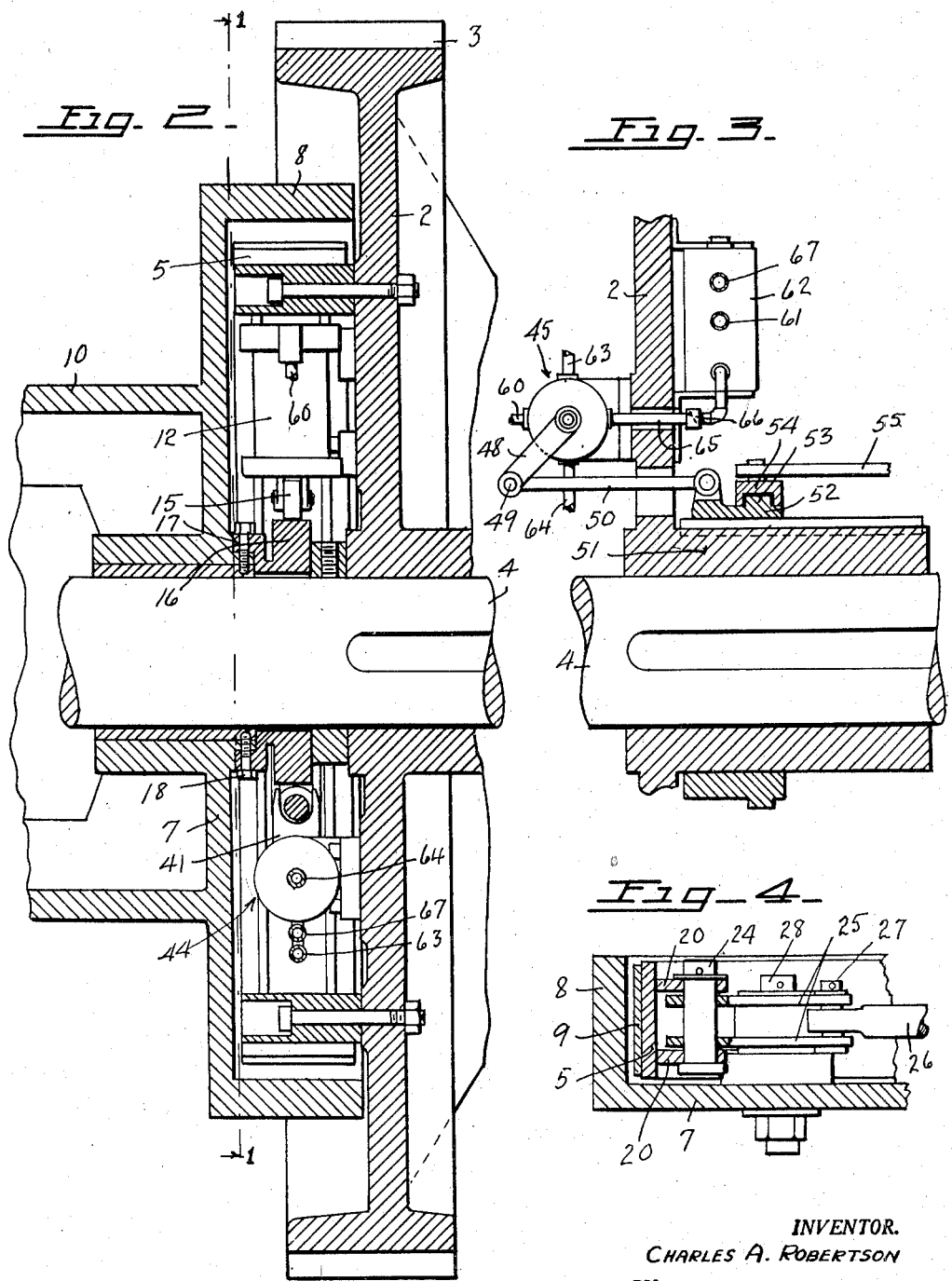
INVENTOR.
CHARLES A. ROBERTSON
BY
Boyken, Mohler, & Beckley
ATTORNEYS.

Sept. 21, 1948.　　　C. A. ROBERTSON　　　2,449,717
HYDRAULIC CLUTCH

Filed March 10, 1945　　　3 Sheets-Sheet 3

INVENTOR.
CHARLES A. ROBERTSON
BY
Boyken, Mohler & Beckley
ATTORNEYS.

Patented Sept. 21, 1948

2,449,717

UNITED STATES PATENT OFFICE 2,449,717

HYDRAULIC CLUTCH

Charles A. Robertson, San Francisco, Calif.

Application March 10, 1945, Serial No. 581,999

4 Claims. (Cl. 192—85)

This invention relates to a hydraulic clutch, and in using the word "clutch" hereafter, the word is intended to include mechanisms such as brakes, as well as those in which both of the members to be engaged are rotatable except where the description or claims specifically relate to one type of mechanism or the other.

One of the objects of the invention is the provision of a hydraulic clutch that is simple, rugged, and dependable, and that is adapted to be actuated from a remote point free from objectionable ducts or conduits extending from such point and from the packing and sealing complications that attend such ducts or conduits.

Another object of the invention is the provision of an improved hydraulic clutch of the type using friction shoes or the like, on one of the clutch members for engagement with a portion of the other member to effect the desired result, and one of which members carries the entire hydraulic system including a pressure pump and the hydraulic circuit. It is to be understood that this clutch is not of the type in which frictional resistance to the flow of the fluid is relied upon to effect the clutching or braking operation.

A still further object of the invention is the provision of an improved hydraulic clutch of the type employing mechanical friction for effecting the braking or clutching operation, and which clutch is arranged and adapted to insure against objectionable slippage between the members when actuated irrespective of leaks in the hydraulic system that produce air pockets.

Heretofore in hoist clutches where a power driven shaft having a gear, pulley, disk, or the like secured thereto is to be engaged with the hoist drum, for rotating the latter, no satisfactory means has been devised for mechanically actuating the clutch to connect them in driving relation from a point remote from the clutch, and attempts to make a hydraulic clutch that may be actuated from a remote point have not met with any better success. As already mentioned, the type of clutch herein referred to is the type in which a mechanical friction element on one clutch member is intended to engage some portion of the other member, and it is an object of this invention to provide a hydraulic clutch of said type that may readily be operated from a remote point.

Other objects and advantages will appear in the specification and drawings.

In the drawings,

Fig. 2 is a sectional view taken substantially along the line 2—2 of Fig. 1.

Fig. 3 is a fragmentary, part sectional and part elevational, semi-diagrammatic view for clearly showing the surge tank and the control valve and means for actuating the valve.

Fig. 4 is a fragmentary, sectional view taken substantially along line 4—4 of Fig. 1.

Figure 1:
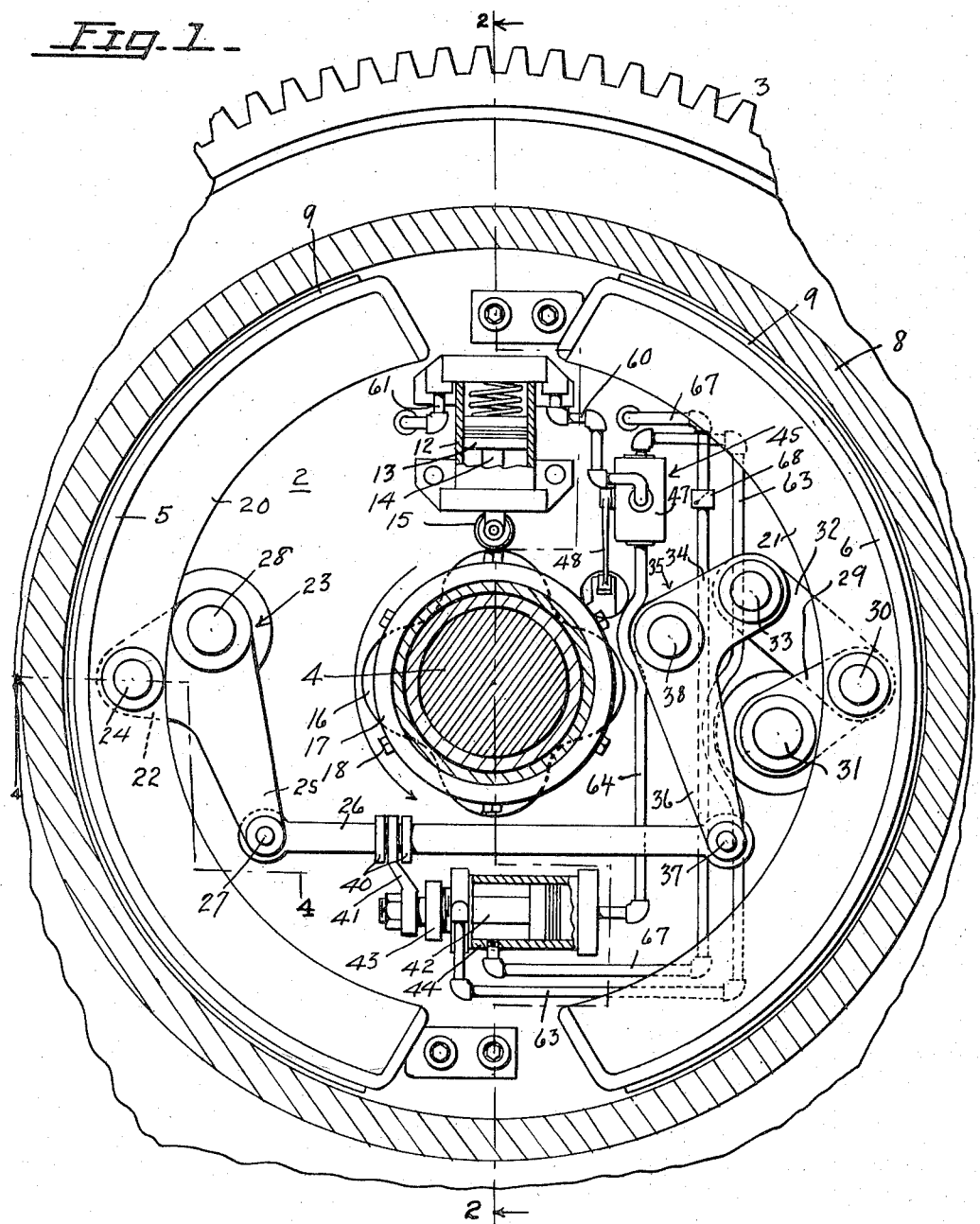
Fig. 1 is a sectional view taken along the line 1—1 of Fig. 2, and showing certain of the elements partly broken away and in section.

The particular example shown in the drawings represents a hoist clutch, although it is to be understood that the description and drawings are merely illustrative and not restrictive of the invention.

In the drawings is shown a gear plate 2 carrying gear teeth 3 for driving by any suitable power means. This gear plate is keyed on shaft 4 and said plate carries a pair of symmetrically disposed, elongated friction shoes 5, 6 that are curved longitudinally to follow the contour of a circle that is concentric with the axis of shaft 4.

Rotatably mounted on shaft 4 is plate 7 that is formed with an annular flange 8 integral therewith and projecting toward the gear plate 2 for enclosing the shoes 5, 6 with the friction lining 9 on the outer convexly curved sides of the latter slightly spaced from the inside of said flange. On the side of plate 7 opposite flange 8 may be formed a conventional hoist drum 10 (Fig. 2) for rope, cable, or the like.

In its broadest aspect, it will be seen that gear plate and friction shoes form one of the clutch members, while the flange 8 and plate 7 forms the other member. By forcing the shoes 5, 6 on revolving plate 2 into frictional engagement with the flange 8 the plate and flange will rotate together, or will tend to do so according to the load connected with the flange and the degree of frictional resistance between the shoes and the flange.

In themselves the foregoing elements are old, and this invention is principally concerned with the structure and the means employed for forcing the shoes against the flange 8. Flange 8 may of course, be provided with a lining in the manner that is common in the brake drums of some automobiles. It is also obvious that were gear plate 2 stationarily secured on the axle housing of an automobile so as to form the backing plate and if flange 7 were the brake drum on the wheel, then the shoes would perform the function of a brake.

Rigidly secured on gear plate 2 at one side of shaft 4 is the cylinder 12 of a single acting reciprocating pump (Fig. 1). The cylinder axis extends radially of shaft 4, and within said cylinder is piston 13 that has a piston rod 14 projecting outwardly of the cylinder toward shaft 4. On the outer end of said rod is a roller or cam follower 15 that is adapted to follow the contour of a plurality of similar cam lobes 16 that are secured to the hub of plate 7. A ring 17 carrying said lobes may be secured to said hub by any suitable means such as bolts 18. A spring 19 reacting between piston 13 and the outer end or head of cylinder 12 functions to continuously and yieldably hold the cam follower against the cam lobes.

From the foregoing, it is apparent that any relative movement between the gear plate and plate 7 will result in actuating the pump.

The shoe 5 is formed with a pair of spaced webs 20 (Fig. 4) extending longitudinally thereof and similar webs 21 are formed on shoe 6. The shoe 5 is pivotally supported at a point intermediate its ends on the end of arm 22 (Fig. 1) of a bell crank 23 by means of a pivot 24 that extends through webs 21. Arm 22, as seen in Fig. 4, may be cleft as well as the other arm 25 of said crank, and one end of a rod 26 may be pivotally secured in the cleft formed at the outer end of arm 25 by pivot 27. Intermediate said arms 22, 25 the crank is pivotally secured to the gear plate 2 by pivot 28.

The other shoe 6 is pivotally supported at a point intermediate its ends on one end of a lever 29 by means of a pivot 30 that extends through webs 21 and through said end of the lever. The other end of lever 29 is secured to the gear plate 7 by means of pivot 31. A link 32 is connected at one of its ends with pivot 30 and its opposite end is pivotally connected by a pivot 33 with one arm 34 of a bell crank 35. The other arm 36 of said bell crank is pivotally connected by pivot 37 with the end of rod 26 that is opposite the pivot 27. A pivot 38 secured to gear plate 2 pivotally secures the crank 35 to said plate at a point intermediate arms 34, 36.

This arrangement of cranks, pivots, lever, and link with respect to shoes 5, 6 is such that upon rotation of the gear plate 2 clockwise as shown in Fig. 1, and upon movement of the rod 26 to the left, the shoes 5, 6 will be moved radially outwardly and also clockwise and into engagement with flange 8. This direction of movement of the shoes results in a high frictional resistance at a relatively low input of power inasmuch as the shoes tend to be drawn automatically into progressively tighter engagement with the drum when once in frictional engagement with the latter. It is pertinent to note that the shoes are each suspended freely from a central point along the webs of each shoe. Therefore the shoes are self-aligning with the flange and give maximum efficiency. This mounting of the shoes including the general direction of their travel with respect to the flange is important whether in a clutch or brake. In the case of a brake wherein one of the two main clutch members would be substantially stationary, such as gear plate 2, the direction of rotation of flange 8 (which corresponds with a brake drum) would be clockwise, whereby the arcuate direction of travel of the shoes about pivots 28, 30 would be radially outwardly and generally in the same direction of travel of the flange.

As has already been indicated, the simultaneous movement of the shoes 5, 6 is accomplished by axial movement of the rod 26 either in one direction or the other.

On rod 26 are secured a pair of spaced collars 40, and between said collars is the forked end of an arm 41 positioned to straddle the rod. The opposite end of said arm is secured to the outer end of a piston rod 42, which rod extends through a packing gland 43 into a cylinder 44 where it is connected to piston 44'. This is a double acting piston in that hydraulic pressure may be applied to either one side or the other to move the piston in one direction or the other for thereby moving rod 26 in either one direction or the other as desired and as will be explained later.

The cylinder 44 is secured to gear plate 2 and it will therefore, maintain its position relative to rod 26 during revolution of the gear plate.

Also secured on gear plate 2 is a main control valve generally designated 45. The ports in this valve are diagrammatically illustrated in Figs. 5 to 7, the valve body 46 being rotatable within the valve housing 47 for rotating said body into the desired positions relative to the lines connected with the housing. The said body is provided with a shaft projecting through the housing. The outwardly projecting end of said shaft is secured to one end of a lever arm 48 (Fig. 3) and the opposite end of said arm is pivotally connected at 49 with one end of a link 50. Link 50 may extend generally parallel with shaft 4 and alongside hub 51 of gear plate 2. The opposite end of link 50 is pivotally secured to a ring 52 that is splined on hub 51 for axial movement relative to said hub while securing said ring to said hub for rotation therewith.

The ring 52 (Fig. 3) is formed with an annular outwardly projecting rib 53 that is in slidable engagement with a conventional yoke 54, said yoke being connected to one end of a control rod 55. This rod 55 may extend to any remote point or intermediate conventional cranks and linkage or other transmission means may be interposed between the rod and such remote point for moving said rod axially thereof or for moving the ring 52 axially of shaft 4 to thereby rotate the valve body 46 of valve 45. The important thing is that the structure up to and including the ring 52 and yoke 54, or the equivalent of the latter, enables actuation of the yoke or ring axially of shaft 4. Any person of slight skill in the art can provide the required means for moving the ring 52 axially of shaft 4 from practically any remote point.

The head or head end of pump cylinder 12, or the end opposite that from which the piston rod 14 projects, is in communication with a pair of conduits 60, 61. The opposite end of conduit 60, which conduit may be called the "pressure conduit" inasmuch as it functions to transmit fluid under pressure into either one or the other ends of cylinder 44, is connected with one side of valve 45. The opposite end of conduit 61 communicates with a surge tank 62 that is carried on the side of gear plate 2 that is opposite the cylinder 12 (Fig. 3).

The left hand end of cylinder 44 (as seen in Figs. 1 and 5 to 7) or the end from which piston rod 42 projects, communicates with one end of a conduit 63. The opposite end of said conduit connects with valve 45. The other end of cylinder 44 communicates with one end of a conduit 64, while the opposite end of said conduit 64 connects with valve 45.

Communicating directly between said valve 45 and surge tank 62 is a conduit 65 having a check valve 66 therein that is adapted to open from the valve to the tank.

Adjacent the joint where conduit 63 opens into the end of cylinder 44, but slightly spaced therefrom in direction toward the other end of the cylinder remote therefrom, is an opening for one end of a conduit 67. The opposite end of this conduit 67 communicates with surge tank 62 and has a check valve 68 therein. One thing to note about this conduit 67 is that the opening 69 (Figs. 5 to 7) through which it communicates with the interior of cylinder 44 is restricted as compared with the openings through which conduits 63, 64 communicate with the said cylinder for a purpose later explained. The check valve 68 opens for passage of fluid in the conduit 67 from cylinder 44 to tank 62.

The four conduits 60, 63, 64 and 65 may connect with valve 45 at four equally spaced points around the housing 47 whereby the two passages 70, 71 in the valve body may readily connect any two of the desired conduits for directing the fluid therein as desired.

In actual practice I may provide as many or few lobes 16 on the cam that is secured to plate 7, as may be desired or found necessary. In any event, it will be seen that as long as there is any relative movement between the hoist drum 10, and the gear plate 2, the pump will be actuated for pumping, and the speed or number of reciprocations of the pump piston per minute will be directly proportional to the difference in the rate of movement between the drum hoist and gear plate. Thus when the hoist drum is stationary and the gear plate is in rotation at a certain rate of speed, the pumping will be faster than when the hoist drum is also revolving, provided the gear plate does not change its speed. If the gear plate and hoist drum rotate at the same speed, then the pumping action ceases.

The surge tank 62 and all conduits including cylinder 44 are preferably filled with any desired liquid adapted for use in hydraulic pressure systems. A suitable filling opening is provided in the surge tank for this purpose.

Figure 6:
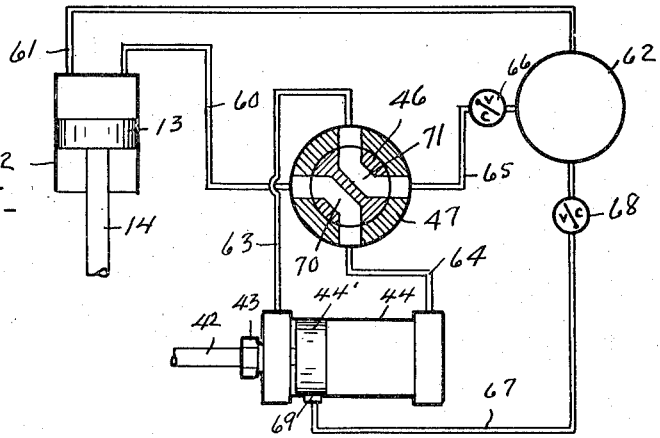
Fig. 6 is a diagrammatic view of the hydraulic system with the control valve and other elements in position for actuating the clutch.

Assuming the operator wishes to connect the hoist drum 10 with rotating shaft 4 for driving the drum, the valve body 46 is rotated to the position shown in Fig. 6 whereupon liquid is pumped through conduit 60, passageway 70, and conduit 64 into the end of cylinder 44 for forcing piston 44' to the left, thereby moving rod 26 (Fig. 1) to the left and causing application of the shoes to the flange 8. The liquid in the end of cylinder 44 with which conduits 63, 67 communicate is forced through said conduits into the surge tank 2 past check valves 66, 68, and the pumping will continue until the hoist drum 10 and shaft 4 are rotating together in direct 1 to 1 ratio. Any sudden increase in the load on the hoist drum whereby said drum will move relative to shaft 4 will result in the pumping action commencing again until the two are again back to the 1:1 ratio.

Figure 7:
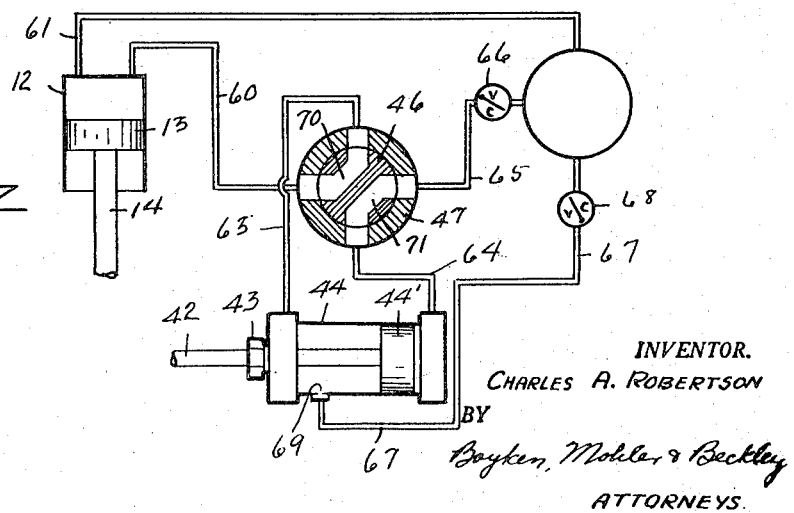
Fig. 7 is a diagrammatic view of the hydraulic system with the control valve and other elements in position for releasing the clutch, but before movement of the valve to the neutral position shown in Fig. 5.

When the operator wishes to release the clutch or to disconnect the hoist drum from driving relation with the shaft, the valve body 46 is rotated to the position shown in Fig. 7 in which the pressure conduit 60 communicates with the end of the cylinder 44 for forcing the piston 44' and consequently rod 26, to the right for releasing the shoes. The conduit 64 now communicates with the surge tank to permit the fluid in the end of the cylinder nearest conduit 64 to escape.

Figure 5:
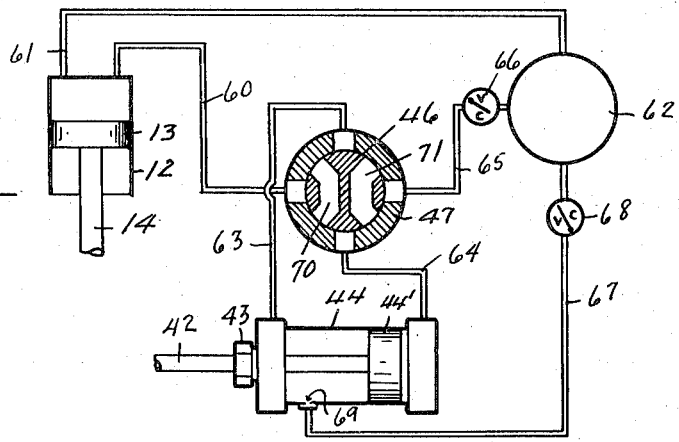
Fig. 5 is a diagrammatic view of the hydraulic system including the control valve, in neutral non-pumping position.

In order to prevent the pump from pumping against pressure when the clutch is disengaged, the valve body is turned to the position shown in Fig. 5 in which the conduit 60 is closed. In this position no pumping occurs, but instead there is merely a slight reciprocal movement of the fluid in the conduit leading to the surge tank, and perhaps a similar movement of the fluid in conduit 60, but the influence of this movement is ineffective on the check valves 66, 68. If the valve body should be left in the position shown in Fig. 7, there is no damage done, inasmuch as the fluid would merely be by-passed to the surge tank through conduit 67.

As a slight pressure will be retained against piston 44' through the conduit 67 when the valve body is in the position shown in Fig. 5, piston 44' will be held against reciprocation or movement in the cylinder 44 until the valve body is turned to cause actuation of the clutch.

In the event of a leakage in the hydraulic system that would result in admission of some air into the same, the clutch will still be operative inasmuch as the pump will very quickly pump the liquid to displace any air pocket. With the pump illustrated the four lobes result in causing four reciprocations of the pump piston for each revolution of the gear plate relative to the flange 8.

I claim:

1. A clutch of the character described comprising a fluid pressure pump in a fluid pressure circuit for pumping fluid under pressure through said circuit upon actuation of said pump, a cylinder having a piston reciprocable therein, a pair of fluid pressure conduits, one end of each of said conduits communicating with one end of said cylinder, a control valve in said circuit with which the opposite ends of said conduits communicate arranged and adapted to admit fluid under pressure from said circuit into one or the other ends of said cylinder for causing movement of said piston in one direction or the other as desired, a rotary drive member carrying a friction element movable in opposite directions, means connecting said element with said piston for causing movement of said element in one direction or the other according to the direction of movement of said piston, means securing said pump, cylinder, conduits, circuit and valve to said drive member for rotation therewith, a driven member coaxial with said drive member positioned for frictional engagement with said element upon said movement of the latter in one direction, and means connected with said valve for actuating the same from a point remote from said drive and driven members, and means carried by said driven member for actuating said pump upon relative rotation between said driven and said driving members.

2. A clutch of the character described comprising a fluid pressure pump in a fluid pressure circuit for pumping fluid under pressure through said circuit upon actuation of said pump, a cylinder having a piston reciprocable therein, a pair of fluid pressure conduits, one end of each of said conduits communicating with one end of said cylinder, a control valve in said circuit with which the opposite ends of said conduits communicate arranged and adapted to admit fluid under pressure from said circuit into one or the other ends of said cylinder for causing movement of said piston in one direction or the other as desired, a rotary drive member carrying a friction element movable in opposite directions, means connecting said element with said piston for causing movement of said element in one direction or the other according to the direction of movement of said piston, means securing said pump, cylinder, conduits, circuit and valve to said drive member for rotation therewith, a driven member coaxial with said drive member positioned for frictional engagement with said element upon said movement of the latter in one direction, and means connected with said valve for actuating the same from a point remote from said drive and driven members, and means carried by said driven member for actuating said pump upon relative rotation between said driven and said driving members, said driven member including a cylindrical drum enclosing said pump, cylinder and said last mentioned means, and said friction element including a clutch shoe within said drum movable axially thereof for said engagement with said drum.

3. A clutch of the character described comprising a fluid pressure pump in a fluid pressure circuit for pumping fluid under pressure through said circuit upon actuation of said pump, a cylinder having a piston reciprocable therein, a pair of fluid pressure conduits, one end of each of said conduits communicating with one end of said cylinder, a control valve in said circuit with which the opposite ends of said conduits communicate arranged and adapted to admit fluid under pressure from said circuit into one or the other ends of said cylinder for causing movement of said piston in one direction or the other as desired, a rotary drive member carrying a friction element movable in opposite directions, means connecting said element with said piston for causing movement of said element in one direction or the other according to the direction of movement of said piston, means securing said pump, cylinder, conduits, circuit and valve to said drive member for rotation therewith, a driven member coaxial with said drive member positioned for frictional engagement with said element upon said movement of the latter in one direction, and means connected with said valve for actuating the same from a point remote from said drive and driven members, and means carried by said driven member for actuating said pump upon relative rotation between said driven and said driving members, said circuit including a surge tank therein, and a by-pass conduit communicating between said surge tank and one end of said cylinder for permitting circulation of fluid to and from said pump and through said cylinder and tank when said piston is at the end of said cylinder opposite said last mentioned one end thereof, said element being out of frictional engagement with said driven member when said piston is in said last mentioned position.

4. A clutch comprising a rotary drive member and a rotatable driven member coaxial therewith, an annular flange on one of said members rigid therewith, a pair of similar friction shoes at opposite sides of its central axis and respectively positioned adjacent said flange, said shoes having lengthwise contours corresponding to the circumferential contour of said flange, pivot means supporting each shoe of said pair at a point centrally between its ends for swinging of the ends of said shoes about each such point and for simultaneous bodily swinging of each shoe radially outwardly relative to the axis of said flange and generally circumferentially of said flange, said pivot means comprising arms respectively pivotally secured at one of their ends to said shoes at said points and pivotally secured at their other ends to the said member that is coaxial with the one carrying said drum, means connecting said arms with each other for simultaneously swinging them about their said other ends, and hydraulically actuated means connected with said last mentioned means for actuating the latter, a hydraulic system carried solely by the member carrying said shoes to provide power for said hydraulically actuated means for actuating the same, said system including a hydraulic pump and a control valve for the fluid pumped by said pump, and means actuated by relative movement between said drive member and said driven member for actuating said pump.

CHARLES A. ROBERTSON.

REFERENCES CITED

The following references are of record in the file of this patent:

UNITED STATES PATENTS

| Number | Name | Date |
|--------|------|------|
| 456,909 | Rice | July 28, 1891 |
| 574,823 | Richards | Jan. 5, 1897 |
| 635,684 | Herschmann | Oct. 24, 1899 |
| 731,483 | Matson | June 23, 1903 |
| 1,805,081 | Drkal | May 12, 1931 |
| 2,153,372 | Hyde | Apr. 4, 1939 |
| 2,190,542 | Geiser | Feb. 13, 1940 |
| 2,317,528 | Hertrich | Apr. 27, 1943 |